US008164323B2

(12) United States Patent
Klingbeil et al.

(10) Patent No.: US 8,164,323 B2
(45) Date of Patent: Apr. 24, 2012

(54) APPARATUS FOR MONITORING DISCHARGE PROCESSES IN A CONDUCTOR OF A MEDIUM-VOLTAGE OR HIGH-VOLTAGE SYSTEM

(75) Inventors: Lars Klingbeil, Berlin (DE); Walter Oechsle, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 342 days.

(21) Appl. No.: 12/525,621

(22) PCT Filed: Jan. 28, 2008

(86) PCT No.: PCT/EP2008/050980
§ 371 (c)(1),
(2), (4) Date: Aug. 31, 2009

(87) PCT Pub. No.: WO2008/092829
PCT Pub. Date: Aug. 7, 2008

(65) Prior Publication Data
US 2010/0026278 A1  Feb. 4, 2010

(30) Foreign Application Priority Data

Feb. 1, 2007  (DE) .................. 10 2007 005 748

(51) Int. Cl.
*G01R 1/00* (2006.01)
(52) U.S. Cl. ................ 324/111; 324/76.11; 324/114
(58) Field of Classification Search .......... None
See application file for complete search history.

(56) References Cited

U.S. PATENT DOCUMENTS

| 3,544,846 | A | 12/1970 | Thompson |
| 6,678,627 | B1 * | 1/2004 | Starr .............. 702/119 |
| 6,879,479 | B2 | 4/2005 | Colombo et al. |
| 7,135,850 | B2 * | 11/2006 | Ramirez ........... 324/142 |
| 2006/0232906 | A1 | 10/2006 | Sueoka |

FOREIGN PATENT DOCUMENTS

| DE | 3048785 A1 | 7/1982 |
| DE | 3531023 A1 | 3/1987 |
| EP | 1260820 A1 | 11/2002 |
| WO | 02061904 A1 | 8/2002 |

OTHER PUBLICATIONS

German Search Report dated Oct. 5, 2007.
International Search Report dated Jun. 25, 2008.

* cited by examiner

*Primary Examiner* — Melissa Koval
*Assistant Examiner* — Trung Nguyen
(74) *Attorney, Agent, or Firm* — Laurence A. Greenberg; Werner H. Stemer; Ralph E. Locher

(57) ABSTRACT

An apparatus monitors discharge processes in a conductor of a medium-voltage system or a high-voltage system. The apparatus contains at least one transformer which is suitable for detecting a current flowing in the conductor. The at least one transformer is connected to a device for monitoring the discharge process. In order to be able to monitor even very short discharge processes in an energy-saving manner, a release and at least one storage circuit are arranged between the transformer and the monitoring device. When a threshold current flowing in the conductor is exceeded, the release switches the monitoring device from a passive mode that is not suitable for monitoring into an active mode that is suitable for monitoring. The storage circuit stores the discharge current to be monitored and/or recorded by the monitoring device.

14 Claims, 1 Drawing Sheet

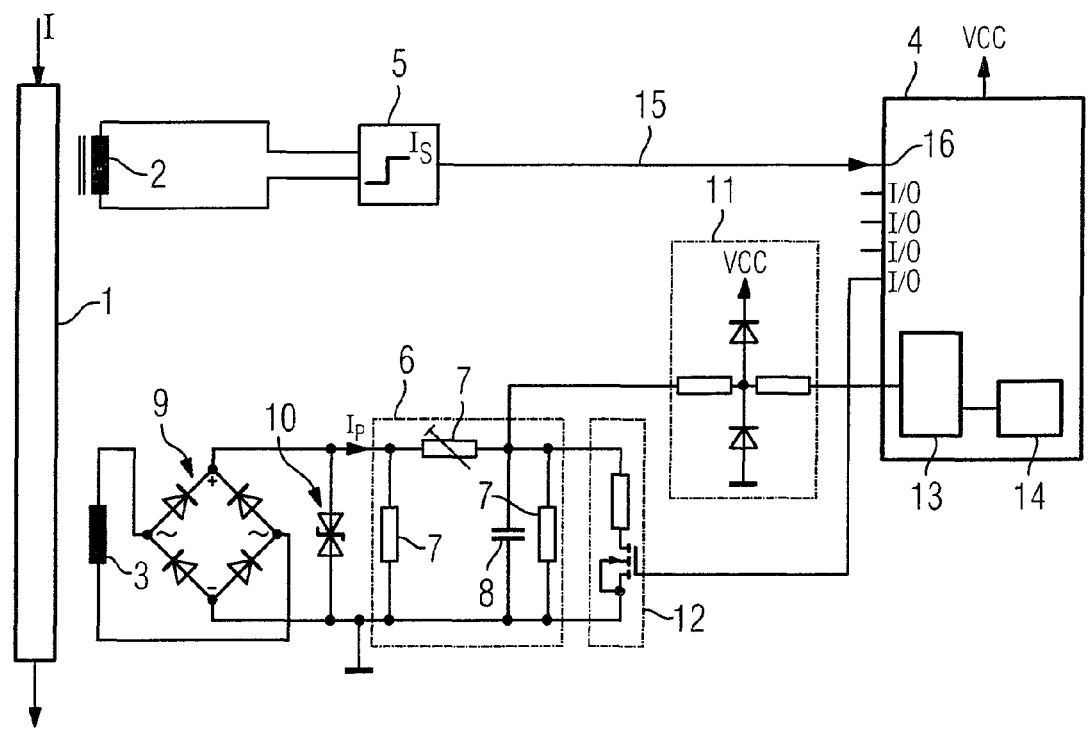

APPARATUS FOR MONITORING DISCHARGE PROCESSES IN A CONDUCTOR OF A MEDIUM-VOLTAGE OR HIGH-VOLTAGE SYSTEM

BACKGROUND OF THE INVENTION

Field of the Invention

The invention relates to an apparatus for monitoring discharge processes in a conductor in a medium- or high-voltage system, which apparatus has at least one transformer which is suitable for detecting a current flowing in the conductor, wherein the at least one transformer is connected to a monitoring device for monitoring the discharge process.

An apparatus of this kind is known from WO 02/061904 A1, for example. It is used for what is known as arrester monitoring, which involves the monitoring of a current flowing in the conductor in a medium- or high-voltage system.

The recording and/or assessment of such current surges is very important from the point of view of arrester monitoring. The discharge processes to be monitored occur very rarely and have only a very short duration, however. The typical time to half-value for the current surges is less than 100 µs. Their occurrence is unpredictable. Detecting these processes requires powerful computer systems, particularly as far as digitization, quantification and assessment are concerned.

BRIEF SUMMARY OF THE INVENTION

The invention is based on the object of developing an apparatus of the type cited at the outset. The aim is to provide a monitoring apparatus for discharge processes which are able to remain in a power-saving passive mode until a discharge process needs to be logged. In this case, the apparatus needs to be able to runup to the active mode in order to be able to record a discharge process, even when said process lasts only for a very short time. Nevertheless, the complete discharge process needs to be able to be logged, even if it is already taking place during a "wake-up phase" for the monitoring apparatus and may already have concluded at the end thereof.

The invention's solution to this problem is characterized for an apparatus of the type cited at the outset in that the transformer and the monitoring device of the apparatus have a release arranged between them which, when a threshold current flowing in the conductor is exceeded, changes the monitoring device from a passive mode, which is not suitable for monitoring, to an active mode, which is suitable for monitoring, and in that the transformer and the monitoring device have a memory circuit arranged between them which stores the discharge current which is to be monitored and/or logged by the monitoring device.

A fundamental feature of the invention is therefore a memory circuit for the current which is to be logged, which is used to store a signal corresponding to the current flowing through the conductor until the monitoring device has run up from a "standby" mode to an active state. The signal stored in the memory circuit is then recorded.

A first development of the invention provides for the release to be connected to a first transformer and for the memory circuit to be connected to a second transformer. Accordingly, two separate transformers are thus provided which are coupled to the conductor and supply the release and/or the memory circuit with the current signal independently of one another.

At least one transformer may be in the form of a current transformer. The current transformer may have an iron core. At least one transformer may also be in the form of an ironless magnetic field probe.

The memory circuit may have at least one resistor and at least one capacitor.

In addition, provision may be made for the transformer and the memory circuit to have a rectifier arranged between them. In this case, the rectifier may be a bridge rectifier, particularly a full-wave rectifier. It may also be a half-wave rectifier.

Provision may also be made for the transformer and the memory circuit to have a piece of protective circuitry arranged between them. The memory circuit and the monitoring device may also have a piece of protective circuitry arranged between them.

The monitoring device may also be connected to a discharge circuit which can be used to discharge the memory circuit—after the discharge current has been recorded.

Finally, provision may be made for the monitoring device to have an analog/digital converter and a reference connected thereto in order be able to record the discharge current which is to be logged in a simple and inherently known manner.

This refinement achieves various advantages:

The apparatus for monitoring the discharge process and particularly the memory circuit are designed such that they do not require any kind of supply voltage and hence have no power consumption. This supports the aim of a power-saving option for the arrester monitoring.

The apparatus is ready for use continually and without delay. Discharge currents can be detected reliably, even if they last only an extremely short time. This is the prerequisite for reliable monitoring and detection of the discharge processes that occur only sporadically and are unpredictable.

The memory circuit is designed such that it is independent of the monitoring device. This provides the prerequisite for putting the monitoring device into a desired "power-save" mode.

The memory circuit can undertake storage of the current surge pulse until the monitoring device has completed its runup from the "power-save" mode to the normal operating state and is able to perform the further processing. This is an essential prerequisite for the monitoring device being able to be put into a desired power-saving "power-save" mode without running the risk of not being able to detect parts of the discharge process.

The memory circuit, which is preferably in the form of a resistor/capacitor network, is designed such that it can already perform preprocessing of the signal which is to be detected. The preprocessing may be in a form dependent on the ratio of the resistors to the capacitor such that the peak value or the mean value of the signal which is to be detected is formed. If appropriate, two separate memory circuits may also be provided for the peak value and for the mean value, respectively. This "analog computational" preprocessing reduces the computational further processing by the monitoring device. This contributes to the further optimization of the power consumption of the apparatus.

Discharge processes occur only very rarely and also last only a short time. For this reason, the monitoring device is required for only a tiny fraction of the total time. This idle time is almost 100% for the detection of the discharge processes. The monitoring device with the analog/digital converter and the reference is designed such that it can be put into the "power-save" mode in the time in which it is not needed. This means that the power requirement is optimized. This provides the prerequisite for implementing a self-powered and economical apparatus for monitoring discharge processes.

The invention provides a fixed and compactly designed appliance, which is arranged on the arrester, for the purpose of monitoring the current. For economic reasons, it is advantageous that the appliance has a dedicated independent power supply. This may be a battery or a solar cell; it is also conceivable for power to be supplied from arrester leakage currents. It is therefore advantageous for the monitoring appliance to be able to be operated in power-saving fashion (what is known as an "intelligent and energy-self-sufficient sensor system").

A permanent active state of the appliance which—even when using the most power-saving circuits (microcontrollers, analog/digital converters, etc.)—consumes a large amount of power is not necessary. For this reason, the proposed apparatus is put into a power-saving passive mode, i.e. into a "power-save mode", similar to a "standby" mode, in which the appliance has only a minimal power consumption (current flows of a few µA).

The runup times ("wake-up time") for changing the monitoring apparatus from its passive state to the active state are in the range from 50 µs to the millisecond range, depending on the type of circuit. Usually, the requisite analog circuit parts, such as the reference of an analog/digital converter in the monitoring appliance, require a very large amount of time for runup and settling into the stable state.

An apparatus of the generic type which, as explained, is in a power-save mode and, when a discharge process occurs, first needs to be "awoken" and then requires a certain time to reach full operability is not a problem in accordance with the invention, however, but rather the discharge processes, which typically last only a short time, can nevertheless be detected completely.

BRIEF DESCRIPTION OF THE DRAWING

The drawing shows an exemplary embodiment of the invention. The single FIGURE schematically shows an apparatus for monitoring discharge processes in a conductor in a medium- or high-voltage system with the components thereof.

DESCRIPTION OF THE INVENTION

The FIGURE shows a conductor 1 in a medium- or high-voltage system. When a discharge process occurs, a current surge I flows through the conductor 1. A current transformer 1 inductively coupled to the conductor 1 detects this current surge I and converts it into an analog voltage signal. This voltage signal is fed to a release 5 (trigger circuit). If the current surge I exceeds a prescribed threshold, i.e. a threshold current $I_S$, the release 5 produces an active trigger signal 15. This trigger signal 15 awakes a monitoring device 4 from a "standby" or "power-save" mode and transfers it to an active, fully operational state in which it can log the discharge current; thus, runup and initialization take place in the monitoring device 4.

In the exemplary embodiment, the trigger signal 15 from the monitoring device 4 is routed to an interrupt-compatible input 16. The monitoring device 4 itself has a powerful microcontroller. The FIGURE shows an integrated analog/digital converter 13 and an analog reference 14 (reference voltage) which is required for this.

The current surge I acts not only on the current transformer 2 but also simultaneously on a second transformer 3, which is in the form of an ironless magnetic field probe in the exemplary embodiment. However, it is also possible for the transformer 3 to be in the form of a current transformer with an iron core. The current I flowing in the conductor 1 produces a proportional magnetic field around the conductor 1 which is detected by the transformer 3 and converted into a proportional current $I_P$.

This current $I_P$ is rectified by a rectifier 9 and supplied to a memory circuit 6 which is in the form of a resistor/capacitor network. The rectifier 9, which is in the form of a bridge rectifier (full-wave rectifier) in the exemplary embodiment, may also be in the form of a half-wave rectifier. When two separate detection circuits with opposite rectification are used, it is possible to distinguish between positive and negative current surges.

The resistors 7 contained in the memory circuit 6 and the capacitor 8 determine the charge time constant and also the discharge time constant for the memory circuit and hence the level of the voltage across the capacitor 8 which is brought about by the current $I_P$. The capacitor 8 which is present in the memory circuit 6 is thus used as a storage element.

The voltage across the capacitor 8 is supplied to the analog/digital converter 13. When the monitoring device 4 has performed and completed its runup and the initialization, it immediately starts to digitize the analog voltage across the capacitor 8 using the analog/digital converter 13. The digitized voltage value obtained can be used for the further processing for the inherently known arrester monitoring.

Once the discharge process has been recorded, the capacitor 8 can be quickly discharged using a discharge circuit 12, the discharge circuit 12 being activated by the monitoring device 4 as illustrated. This means that the memory circuit 6 is ready for fresh storage of a discharge process (reactivation of the detection).

The monitoring device 4 shown may also be of discrete design, comprising a controller and an external analog/digital converter 13 and associated reference 14.

To protect from overvoltages, pieces of protective circuitry 10 and 11 are provided which are arranged between the rectifier 9 and the memory circuit 6 and between the memory circuit 6 and the monitoring unit 4. The pieces of protective circuitry 10 and 11 are intended to protect the respective subsequent circuit parts from overvoltage. However, the pieces of protective circuitry 10, 11 are not required for detecting the discharge processes and merely increase the robustness of the apparatus.

In contrast to the exemplary embodiment, it is also possible for the transformers 2 and 3 to be combined into a single transformer.

The resistors 7 arranged in the memory circuit 6 and the capacitor 8 determine the charge time constant and also the discharge time constant for the memory circuit 6, that is to say the network, and hence also the level of the voltage across the capacitor 8, as explained. By means of a different proportioning of the values of the resistors 7 and of the capacitor 8, it is possible to alter the detection of the discharge processes such that it detects the peak value ("peak-hold") or the average value ("average") of the current surge I. It is also possible to set up two instances of detection in parallel in order to ascertain both values. In this case, two memory circuits 4 arranged in parallel can thus be provided, for example.

When the monitoring device 4 with the associated circuit parts 13, 14 has started to digitize the voltage across the capacitor 8, this voltage can also be digitized cyclically for sampling over time. When the sampling interval is constant and known, this results in further possibilities for evaluating the voltage values for the arrester monitoring.

First, the duration of the discharge process can be determined as follows: the time from the active trigger signal 15 to the first digitization of the voltage across the capacitor 8 can be assumed to be known and constant (system-inherent). The number of sampling operations before decay of the voltage across the capacitor 8 and hence of the surge current I is recognized can be determined.

Secondly, the ascertained average value and the ascertained duration of the discharge process can be used to calculate the energy equivalent useful for arrester monitoring, i.e. how much energy the arrester needed to absorb during the discharge process (this is a significant contributor to the aging thereof.

The capability of the memory circuit 6 to operate independently of the monitoring device 4 and to store the detected signal with the capacitor 8 until runup of the monitoring device 4 has concluded simplifies the selection of the circuits for the monitoring device 4 with its component parts 13 and 14 to a significant extent. The often critical runup time, particularly for the analog circuit parts, is therefore no longer an exclusion criterion for the selection of suitable circuits. The focus of attention when selecting the constituent parts of the apparatus can instead be directed at other properties which determine computational performance.

The use of a storage element in the form of the capacitor 8 with an integrating property is advantageously complemented by the differentiating property of the transformer 3, which in the exemplary embodiment is in the form of an inductively operating magnetic field probe, in order to form an analog map of the current surge I flowing in the arrester. This advantageously supports the concept of performing pre-processing of the signal which is to be detected outside the monitoring device 4.

The fact that the monitoring device 4 does not start to digitize the voltage across the capacitor 8 until after it has run up has the further advantage that the high-energy current surge I in the arrester 1 has already decayed when the digitization is started. The current surges which are possible during discharge processes may extend into the region of 100 kA. These have high electrical fields associated with them which can interfere with the electronics, e.g. the sensitive analog/digital conversion. The time stagger in the processing cleverly avoids the otherwise inevitable influence of high-energy current surges as a result of the injection (EMC) of interference. A physical separation between the transformer 3 and the monitoring device 4 (including the parts 13 and 14) prohibits the desired economic viability of the apparatus, because in this case an advantageous compact design would no longer be possible. However, the mode of operation explained means that this does not cause a problem in the proposed solution.

LIST OF REFERENCE SYMBOLS

1 Conductor
2 Transformer
3 Transformer
4 Monitoring device
5 Release
6 Memory circuit
7 Resistor
8 Capacitor
9 Rectifier
10 Protective circuitry
11 Protective circuitry
12 Discharge circuit
13 Analog/digital converter
14 Reference
15 Trigger signal
16 Interrupt-compatible input
I Current
$I_S$ Threshold current
$I_P$ Proportional current

The invention claimed is:

1. An apparatus for monitoring discharge processes in a conductor in one of a medium-voltage system and a high-voltage system, the apparatus comprising:
   a monitoring device;
   at least one transformer suitable for detecting a discharging current flowing in the conductor, said at least one transformer connected to said monitoring device for monitoring a discharge process;
   a release connected between said transformer and said monitoring device, said release, when a threshold current flowing in the conductor is exceeded, changes said monitoring device from a passive mode, which is not suitable for monitoring, to an active mode, which is suitable for monitoring; and
   at least one storage circuit connected between said transformer and said monitoring device, said at least one storage circuit storing the discharge current which is to be one of monitored and logged by said monitoring device.

2. The apparatus according to claim 1, wherein:
   said at least one transformer includes a first transformer and a second transformer;
   said release is connected to said first transformer; and
   said storage circuit is connected to said second transformer.

3. The apparatus according to claim 1, wherein said at least one transformer is a current transformer.

4. The apparatus according to claim 3, wherein said current transformer has an iron core.

5. The apparatus according to claim 1, wherein said at least one transformer is an ironless magnetic field probe.

6. The apparatus according to claim 1, wherein said storage circuit has at least one resistor and at least one capacitor.

7. The apparatus according to claim 1, further comprising a rectifier connected between said transformer and said storage circuit.

8. The apparatus according to claim 7, wherein said rectifier is a bridge rectifier.

9. The apparatus according to claim 7, wherein said rectifier is a half-wave rectifier.

10. The apparatus according to claim 7, wherein said rectifier is a full-wave rectifier.

11. The apparatus according to claim 1, further comprising a piece of protective circuitry connected between said transformer and said storage circuit.

12. The apparatus according to claim 1, further comprising a piece of protective circuitry connected between said storage circuit and said monitoring device.

13. The apparatus according to claim 1, further comprising a discharge circuit connected to said monitoring device, said discharge circuit being used to discharge said storage circuit.

14. The apparatus according to claim 1, wherein said monitoring device has an analog/digital converter and a reference connected to said analog/digital converter.

* * * * *